United States Patent
Anand

(10) Patent No.: US 9,455,865 B2
(45) Date of Patent: *Sep. 27, 2016

(54) SERVER VIRTUALIZATION

(71) Applicant: International Business Machines Corporation, Armonk, NY (US)

(72) Inventor: Vishal Anand, Bihar (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/857,906

(22) Filed: Sep. 18, 2015

(65) Prior Publication Data

US 2016/0006612 A1    Jan. 7, 2016

Related U.S. Application Data

(63) Continuation of application No. 14/445,267, filed on Jul. 29, 2014, now Pat. No. 9,203,693, which is a continuation of application No. 13/343,262, filed on Jan. 4, 2012, now Pat. No. 8,856,303.

(51) Int. Cl.
*H04L 12/24* (2006.01)
*G06F 11/34* (2006.01)

(52) U.S. Cl.
CPC ....... *H04L 41/0806* (2013.01); *G06F 11/3409* (2013.01); *G06F 11/3442* (2013.01); *G06F 2201/815* (2013.01)

(58) Field of Classification Search
CPC .......... H04L 41/0806; G06F 11/3409; G06F 2201/815; G06F 11/3442
USPC .................. 709/223, 226; 718/102, 104, 106
See application file for complete search history.

(56) References Cited

U.S. PATENT DOCUMENTS

| | | | |
|---|---|---|---|
| 7,356,679 | B1 | 4/2008 | Le et al. |
| 8,856,303 | B2 | 10/2014 | Anand |
| 2006/0294516 | A1 | 12/2006 | Winner et al. |
| 2007/0226341 | A1 | 9/2007 | Mateo |
| 2009/0013301 | A1 | 1/2009 | Ogilvie et al. |
| 2009/0070771 | A1 | 3/2009 | Yuyitung et al. |
| 2009/0133001 | A1 | 5/2009 | Rozenfeld |
| 2010/0030877 | A1 | 2/2010 | Yanagisawa |
| 2010/0064226 | A1 | 3/2010 | Stefaniak et al. |

(Continued)

OTHER PUBLICATIONS

Amendment After Final filed Nov. 21, 2013 in response to Final Office Action (Mail Date Oct. 4, 2013) for U.S. Appl. No. 13/343,262, filed Jan. 4, 2012.

(Continued)

*Primary Examiner* — Joon H Hwang
*Assistant Examiner* — Abdulkader M Alriyashi
(74) *Attorney, Agent, or Firm* — Schmeiser, Olsen & Watts; John Pivnichny

(57) ABSTRACT

A resource requirements method and system is provided. The method includes identifying dependencies and calculating a utilization value for a source server. The source server is mapped to an application and a source infrastructure is compared to a target infrastructure. Deficiencies and differences associated with the target infrastructure are determined and dependency requirements for fulfillment in the target infrastructure are generated. The utilization value is compared to a resource capability of the target server and resource requirements for fulfillment on the target server are generated.

13 Claims, 3 Drawing Sheets

(56) References Cited

U.S. PATENT DOCUMENTS

| | | |
|---|---|---|
| 2010/0306382 A1 | 12/2010 | Cardosa et al. |
| 2011/0029651 A1 | 2/2011 | Snyder et al. |
| 2011/0161851 A1 | 6/2011 | Barber et al. |
| 2011/0209156 A1 | 8/2011 | Box et al. |
| 2011/0252135 A1 | 10/2011 | Kudo |
| 2012/0131573 A1 | 5/2012 | Dasari et al. |
| 2013/0173773 A1 | 7/2013 | Anand |
| 2014/0337534 A1 | 11/2014 | Anand |

OTHER PUBLICATIONS

Amendment filed Jun. 20, 2013 in response to Office Action (Mail Date Apr. 11, 2013) for U.S. Appl. No. 13/343,262, filed Jan. 4, 2012.

Blum, Server Virtualization, INS IT Industry Survey, www.ins.com, Apr. 2006, pp. 1-8.

Brocade Server Virtualization Assessment Service, Optimizing Data Center Virtualization, 2008 Brocade Communication Systems, Inc. 2 pages.

Cisco, Cisco Data Center Virtualization Assessment Service, 2009 Cisco Systems Inc., pp. 1-5.

Final Office Action (Mail Date Oct. 4, 2013) for U.S. Appl. No. 13/343,262, filed Jan. 4, 2012.

Managing VMware Best Practices by Mapping Dependencies across Physical and Virtual Environments, Sep. 2008, EMA, 9 pages.

Notice of Allowance (Mail Date Jun. 4, 2014) for U.S. Appl. No. 13/343,262, filed Jan. 4, 2012.

Notification of Transmittal of the International Search Report and the Written Opinion of the International Searching Authority, or the Declaration; PCT/IB2012/057368; Mail Date May 23, 2013; 16 pages.

Office Action (Mail Date Apr. 11, 2013) for U.S. Appl. No. 13/343,262, filed Jan. 4, 2012.

Orange Business Services helping you make your business more successful, Retrieved from the Internet: < URL: http://www.orange-business.com/content/mnc/kc/fct-Server-Virtualization-Assessment.pdf>, Jun. 28, 2011, 2 pages.

Server Virtualization Assessment Service, Corporate Technologies, Understand the Feasibility of Server Virtualization:, Retrieved from the Internet: < URL: www.cptech.com> [retrieved on Jun. 28, 2011]; 4 pages.

Spellmann et al., Server Consolidation Using Performance Modeling, 1520-9202, 2003, IEEE Computer Society, Sep./Oct., pp. 31-36.

Zhou, Feasibility Analysis of the Virtual Technology for the Server in Library, Retrieved from the Internet: < URL: http://en.cnki.com.cn/Article_en/CJFDTOTAL-TSGL200803020.HTM >, Jun. 28, 2011, 3 pages.

zSeries Server Consolidation and Application Integration, IBM@server zSeries, Apr. 2004, 13 pages.

Office Action (Mail Date Apr. 22, 2015) for U.S. Appl. No. 14/445,267, filed Jul. 29, 2014.

Amendment filed Jun. 22, 2015 in response to Office Action (Mail Date Apr. 22, 2015) for U.S. Appl. No. 14/445,267, filed Jul. 29, 2014.

Notice of Allowance (Mail Date Jul. 23, 2015) for U.S. Appl. No. 14/445,267, filed Jul. 29, 2014.

SERVER VIRTUALIZATION

This application is a continuation application claiming priority to Ser. No. 14/445,267 filed Jul. 29, 2014, now U.S. Pat. No. 9,203,693 issued Dec. 1, 2015, which is a continuation application claiming priority to Ser. No. 13/343,262 filed Jan. 4, 2012 now U.S. Pat. No. 8,856,303 issued Oct. 7, 2014.

FIELD

The present invention relates to a method and associated system for virtualizing servers.

BACKGROUND

Modifying systems typically comprises an inaccurate process with little flexibility. System management typically includes a complicated process that may be time consuming and require a large amount of resources. Accordingly, there exists a need in the art to overcome at least some of the deficiencies and limitations described herein above.

SUMMARY

The present invention provides a method comprising: identifying, by a computer processor of a virtualization server, dependencies of a source server, wherein the source server comprises a physical server; calculating, by the computer processor, an average utilization value associated with the source server and associated physical resources; mapping, by the computer processor, the source server to an application; comparing, by the computer processor, a source infrastructure with a target infrastructure, wherein the source infrastructure is associated with the source server, and wherein the target infrastructure is associated with a target server, and wherein the target server comprises a virtual server associated with virtualizing the source server; determining, by the computer processor based on results of the identifying, the calculating, and the comparing, deficiencies and differences associated with the target infrastructure; generating, by the computer processor, a list comprising dependency requirements for fulfillment in the target infrastructure; second comparing, by the computer processor, the average utilization value with a resource capability of said target server; and generating, by said computer processor, a list comprising resource requirements for fulfillment on said target server.

The present invention provides a virtualization server comprising a computer processor coupled to a computer-readable memory unit, the memory unit comprising instructions that when executed by the computer processor implements a method comprising: identifying, by said computer processor, dependencies of a source server, wherein the source server comprises a physical server; calculating, by the computer processor, an average utilization value associated with the source server and associated physical resources; mapping, by the computer processor, the source server to an application; comparing, by the computer processor, a source infrastructure with a target infrastructure, wherein the source infrastructure is associated with the source server, and wherein the target infrastructure is associated with a target server, and wherein the target server comprises a virtual server associated with virtualizing the source server; determining, by the computer processor based on results of the identifying, the calculating, and the comparing, deficiencies and differences associated with the target infrastructure; generating, by the computer processor, a list comprising dependency requirements for fulfillment in the target infrastructure; second comparing, by the computer processor, the average utilization value with a resource capability of the target server; and generating, by the computer processor, a list comprising resource requirements for fulfillment on the target server.

The present invention provides a computer program product, comprising a computer readable storage device storing a computer readable program code, the computer readable program code comprising an algorithm that when executed by a computer processor of a virtualization server implements a method, the method comprising: identifying, by said computer processor, dependencies of a source server, wherein the source server comprises a physical server; calculating, by the computer processor, an average utilization value associated with the source server and associated physical resources; mapping, by the computer processor, the source server to an application; comparing, by the computer processor, a source infrastructure with a target infrastructure, wherein the source infrastructure is associated with the source server, and wherein the target infrastructure is associated with a target server, and wherein the target server comprises a virtual server associated with virtualizing the source server; determining, by the computer processor based on results of the identifying, the calculating, and the comparing, deficiencies and differences associated with the target infrastructure; generating, by the computer processor, a list comprising dependency requirements for fulfillment in the target infrastructure; second comparing, by the computer processor, the average utilization value with a resource capability of the target server; and generating, by the computer processor, a list comprising resource requirements for fulfillment on the target server.

The present invention advantageously provides a simple method and associated system capable of managing systems.

DETAILED DESCRIPTION

Figure 1:
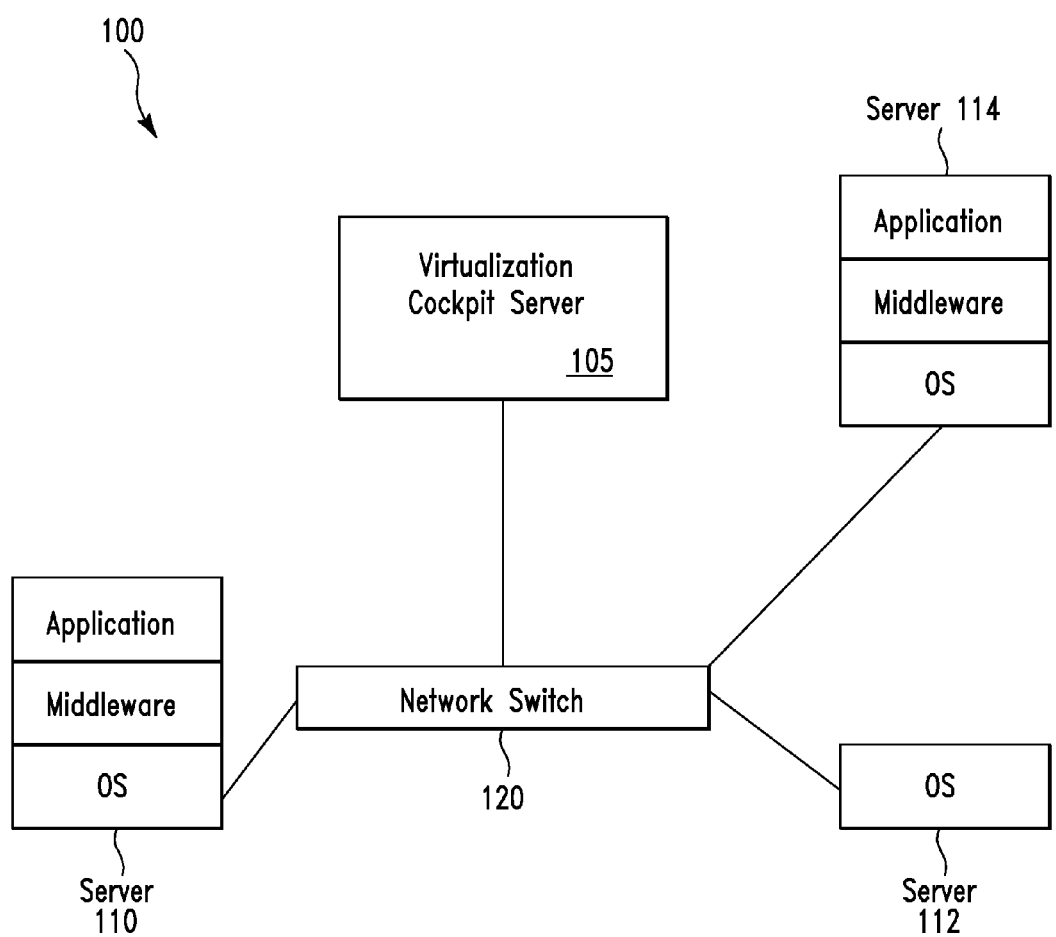
FIG. 1 illustrates a system for consolidating and virtualizing servers, in accordance with embodiments of the present invention.

FIG. 1 illustrates a system 100 for consolidating and virtualizing servers, in accordance with embodiments of the present invention. System 100 performs a method for predicting a risk associated with consolidating and virtualizing servers. System 100 performs a method comprising the following steps associated with consolidating/virtualizing servers and predicting a risk:

1. Identifies dependencies of a physical server at an infrastructure and application level.
2. Calculates an average utilization of physical resources over peak and off peak hours during weekdays and weekends.
3. Map a physical server to an application.
4. Comparing a source infrastructure/environment with a target infrastructure/environment.

5. Determines deficiencies and differences for the target infrastructure/environment based on results of steps 1 and 2.
6. Generates a list of dependency requirements to be fulfilled in the target infrastructure/environment.
7. Compares a source server resource utilization rate and a target server resource capacity.
8. Generates a list of resource requirements to be fulfilled on a target server.

System 100 comprises a virtualization cockpit server 105 connected to a server 110, a server 112 and a server 114 through a network switch 120. Virtualization cockpit server 105 is a management server for communicating with source servers (e.g., server 110) and target servers (e.g., servers 112 and 114). Virtualization cockpit server 105 comprises software for enabling commands for retrieving applicable information for performing the aforementioned method. Server 110 comprises an operating system, middleware, and an application (i.e., agents). Server 112 comprises an operating system. Server 114 comprises an operating system, middleware, and an application. Virtualization cockpit server 105 communicates with server 110, server 112, and server 114 via a client server communication model. Virtualization cockpit server 105 comprises a user interface for presenting (to a user) virtualization feedback. For example, virtualization cockpit server 105 may determine that server 110 may or may not be vitualized/consolidated with server 112 or 114. The determination may be presented to the user.

Virtualization cockpit server 105 comprises a master server in a server-client model of a network. The master server may communicate to all other servers (e.g., server 110, server 112, and server 114) in the network in the client-server model. Additionally, the master server may be connected to a configuration management database (CMDB) reporting system and interface tools such as, inter alia, a server resource management (SRM) tool (i.e., a capacity monitoring tool) and an application dependency and discovery manager tool. The master server front end may comprise a user interface allowing a user to enter a hostname of a source server. The user interface may UI request the hostname of the source server for virtualization. The user may enter the hostname of the server for determining a feasibility of that server to be virtualized. In response, the master server may communicate to that server entered by the user and may perform the following actions:
1. Identify components such as a database, middleware, and an application running on the server through the CMDB. Additionally, the master server may record a business criticality of the application system.
2. Collect capacity utilization for the server and trend it for a CPU, memory, and network and I/O.
3. Identify and record a dependency on the server from an entire application stack perspective.

After completion of the aforementioned steps, the user interface of master server may request a target server for virtualization of the source server. In response, the user may enter a target server hostname. The master server compares the source server trended capacity in terms of CPU, memory, network, and I/O with the target server and records a result in terms of whether the target server may meet the capacity requirement (or not). The master server inspects requirements of an application to be up and running in the target server on the hardware and OS level and records the results if any gaps are found. Additionally, the master server may record source environment dependencies and report (to the user through a user interface) dependencies that need to be met in the target environment. After comparing the source server requirements with the target environment, the user interface will display a result to the user. For example, results may indicate that: it is feasible if a target environment meets all the requirements, it is not feasible if a target environment does not meet all the requirements, etc. System 100 performs the following functions:
1. Identifies an applicable server candidate for virtualization.
2. Predicts a risk associated with post virtualization.
3. Presents dependency requirements for virtualization in a target environment.
4. Presents resource requirements for virtualization in the target environment
5. Generates alerts indicating whether a source physical server comprises a correct candidate for virtualization.
6. Generates alerts indicating whether source environment dependencies may be fulfilled in the target environment.
7. Compares source and target environments for identifying differences and requirements for virtualization.
8. Generates alerts indicating if all requirements may be met (i.e., after studying multiple environments and utilization patterns).

Figure 2:
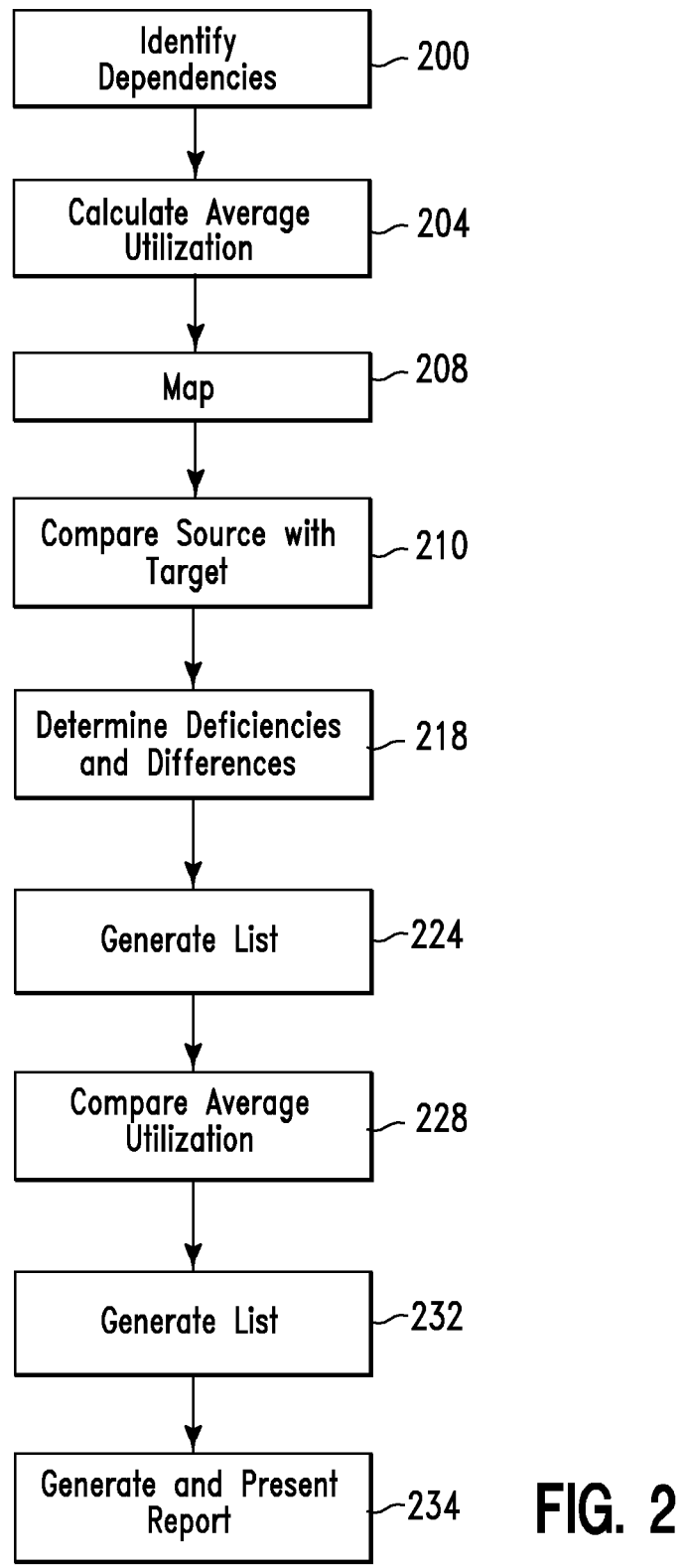
FIG. 2 illustrates an algorithm detailing a process flow enabled by FIG. 1 for consolidating and virtualizing servers, in accordance with embodiments of the present invention.

FIG. 2 illustrates an algorithm detailing a process flow enabled by system 100 of FIG. 1, in accordance with embodiments of the present invention. In step 200, a computer processor of a virtualization server (e.g., virtualization server 105 in FIG. 1) identifies dependencies of a source server (e.g., server 110 in FIG. 1). The source server is a physical server. A client installed on all systems in system 100 of FIG. 1, communicates with the virtualization server. The virtualization server comprises sensors to identify if a related component is installed on a client server. The sensors may be enabled to discover all related software/applications/middleware on top of an operating system. In step 204, the computer processor calculates an average utilization value associated with the source server and associated physical resources. A client installed on all systems in system 100 of FIG. 1, communicates with the virtualization server. This client runs the scripts/commands on client servers to collect the performance and utilization data for a CPU, memory, I/O, and network at a various intervals. The performance and utilization data is transmitted to the virtualization server for analysis. In step 208, the computer processor maps the source server to an application. In step 210, the computer processor compares a source infrastructure (associated with the source server) with a target infrastructure associated with a target server (e.g., server 112 or 114 of FIG. 1). The target server comprises a virtual server associated with virtualizing the source server. The comparison process comprises a pattern matching process between data received from the source and target environments. Determined mismatches are displayed for a user. In step 218, the computer processor determines (i.e., based on results of steps 200, 204, and 208) deficiencies and differences associated with the target infrastructure. In step 224, the computer processor generates a list comprising dependency requirements for fulfillment in the target infrastructure. In step 228, the computer processor compares the average utilization value with a resource capability of the target server. In step 232, the computer processor generates a list comprising resource requirements for fulfillment on the target server. In step 234, the computer processor generates and presents (to a user) a feasibility report indicating a feasibility of the resource requirements for fulfillment on the target server.

Figure 3:
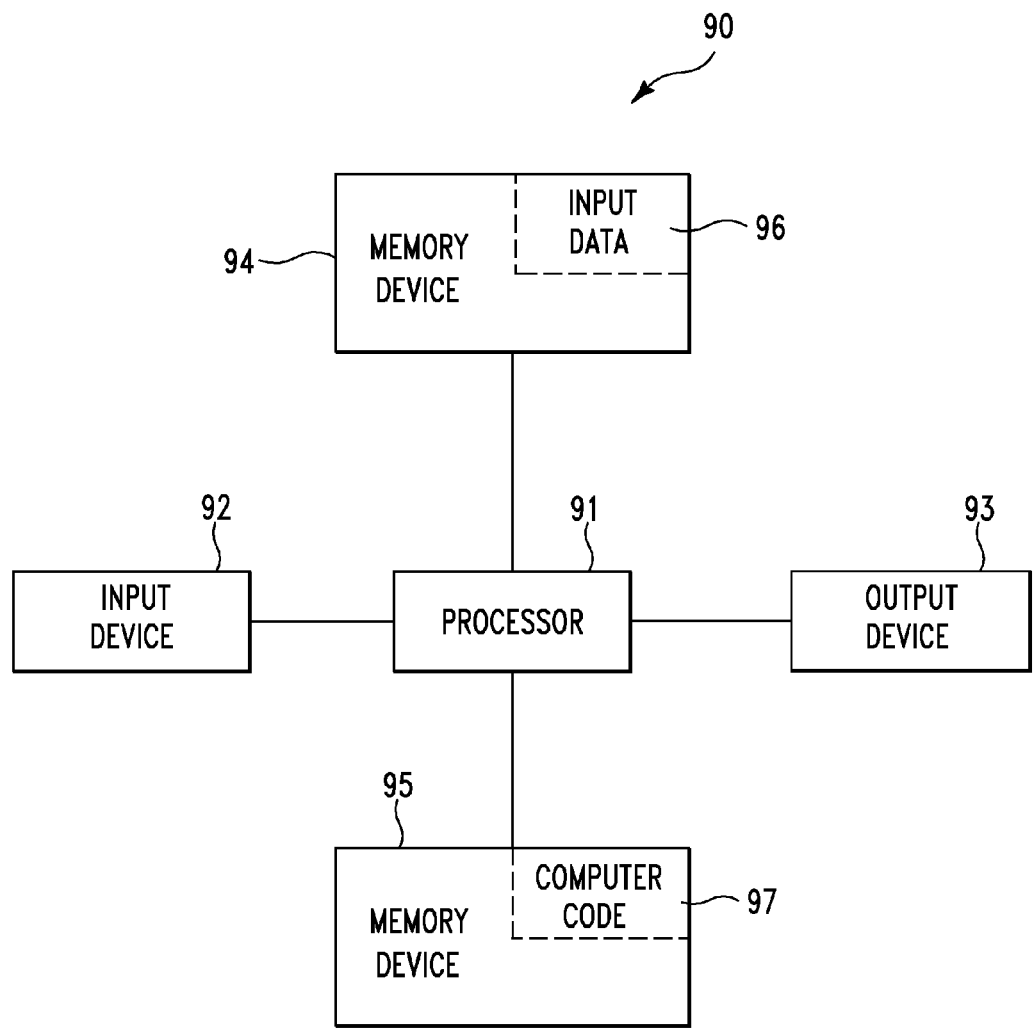
FIG. 3 illustrates a computer apparatus used for consolidating and virtualizing servers, in accordance with embodiments of the present invention.

FIG. 3 illustrates a computer apparatus 90 used by system 100 of FIG. 1 for consolidating and virtualizing servers, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for consolidating and virtualizing servers. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 3) may comprise the algorithm of FIG. 2 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise the computer usable medium (or said program storage device).

Still yet, any of the components of the present invention could be created, integrated, hosted, maintained, deployed, managed, serviced, etc. by a service supplier who offers to consolidate and virtualize servers. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for creating a business content hierarchy. In another embodiment, the invention provides a business method that performs the process steps of the invention on a subscription, advertising, and/or fee basis. That is, a service supplier, such as a Solution Integrator, could offer to consolidate and virtualize servers. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 3 shows the computer system 90 as a particular configuration of hardware and software, any configuration of hardware and software, as would be known to a person of ordinary skill in the art, may be utilized for the purposes stated supra in conjunction with the particular computer system 90 of FIG. 3. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A method comprising:

identifying, by a computer processor of a virtualization server executing sensors of said virtualization server, related components of a source server with respect to a target server, wherein said source server comprises a physical server comprising dependencies;

calculating, by said computer processor executing a client running scripts/commands, an average utilization value associated with said source server and associated physical resources, wherein said average utilization value comprises a capacity utilization for said source server trended for CPU utilization, memory utilization, network utilization, and I/O utilization, and wherein said average utilization value is associated with peak and off peak hours during weekdays and weekends;

mapping, by said computer processor, said source server to an application;

comparing, by said computer processor, a source infrastructure with a target infrastructure, wherein said source infrastructure is associated with said source server, and wherein said target infrastructure is associated with said target server, wherein said comparing comprises performing a pattern matching process between data received from said source infrastructure and said target infrastructure, and wherein said target server comprises a virtual server associated with virtualizing said source server;

determining, by said computer processor based on mismatches of said pattern matching process and results of said identifying said dependencies, said calculating, and said comparing, deficiencies and differences associated with said target infrastructure;

generating, by said computer processor, a list comprising dependency requirements for fulfillment in said target infrastructure;

second comparing, by said computer processor, said average utilization value with a resource capability of said target server;

generating, by said computer processor, a list comprising resource requirements for fulfillment on said target server;

determining, by said computer processor, if said target server is appropriate for consolidation with said source server;

generating, by said computer processor, an alert indicating if said source server comprises a correct candidate for said virtualizing said source server;

generating, by said computer processor, an alert identifying differences and requirements for virtualization of said source server;

generating, by said computer processor, an alert indicating if said source dependencies are appropriate for fulfillment in said target infrastructure;

generating, by said computer processor based on results of evaluating multiple environments and utilization patterns, an alert indicating if all applicable requirements are appropriate for fulfillment;

presenting, by said computer processor via a graphical user interface, a feasibility report indicating a feasibility of said resource requirements for fulfillment on said target server.

2. The method of claim 1, wherein said dependencies of said source server are determined on an infrastructure and application level.

3. The method of claim 1, wherein said dependencies of said source server comprise components selected from the group consisting of a database, middleware running on the source server, and a business criticality.

4. The method of claim 1, further comprising:
presenting, by said computer processor via said graphical user interface, said resource requirements for fulfillment on said target server.

5. The method of claim 1, further comprising:
providing a process for supporting computer infrastructure, said process comprising providing at least one support service for at least one of creating, integrating, hosting, maintaining, and deploying computer-readable code in the virtualization server, wherein the code in combination with the computing apparatus is configured to perform the method of claim 1.

6. A virtualization server comprising a computer processor and a computer-readable memory unit, the computer processor coupled to the computer-readable memory unit, said computer-readable memory unit comprising instructions that when executed by the computer processor implements a method comprising:
identifying, by said computer processor executing sensors of said virtualization server, related components of a source server with respect to a target server, wherein said source server comprises a physical server comprising dependencies;
calculating, by said computer processor executing a client running scripts/commands, an average utilization value associated with said source server and associated physical resources, wherein said average utilization value comprises a capacity utilization for said source server trended for CPU utilization, memory utilization, network utilization, and I/O utilization, and wherein said average utilization value is associated with peak and off peak hours during weekdays and weekends;
mapping, by said computer processor, said source server to an application;
comparing, by said computer processor, a source infrastructure with a target infrastructure, wherein said source infrastructure is associated with said source server, and wherein said target infrastructure is associated with said target server, wherein said comparing comprises performing a pattern matching process between data received from said source infrastructure and said target infrastructure, and wherein said target server comprises a virtual server associated with virtualizing said source server;
determining, by said computer processor based on mismatches of said pattern matching process and results of said identifying said dependencies, said calculating, and said comparing, deficiencies and differences associated with said target infrastructure;
generating, by said computer processor, a list comprising dependency requirements for fulfillment in said target infrastructure;
second comparing, by said computer processor, said average utilization value with a resource capability of said target server;
generating, by said computer processor, a list comprising resource requirements for fulfillment on said target server;
determining, by said computer processor, if said target server is appropriate for consolidation with said source server;
generating, by said computer processor, an alert indicating if said source server comprises a correct candidate for said virtualizing said source server;
generating, by said computer processor, an alert identifying differences and requirements for virtualization of said source server;
generating, by said computer processor, an alert indicating if said source dependencies are appropriate for fulfillment in said target infrastructure;
generating, by said computer processor based on results of evaluating multiple environments and utilization patterns, an alert indicating if all applicable requirements are appropriate for fulfillment;
presenting, by said computer processor via a graphical user interface, a feasibility report indicating a feasibility of said resource requirements for fulfillment on said target server.

7. The computing system of claim 6, wherein said dependencies of said source server are determined on an infrastructure and application level.

8. The computing system of claim 6, wherein said dependencies of said source server comprise components selected from the group consisting of a database, middleware running on the source server, and a business criticality.

9. The computing system of claim 6, wherein said method further comprises:
presenting, by said computer processor via said graphical user interface, said resource requirements for fulfillment on said target server.

10. A computer program product, comprising a computer readable hardware storage device storing a computer readable program code, said computer readable program code comprising an algorithm that when executed by a computer processor of a virtualization server implements a method, said method comprising:
identifying, by said computer processor executing sensors of said virtualization server, related components of a source server with respect to a target server, wherein said source server comprises a physical server comprising dependencies;
calculating, by said computer processor executing a client running scripts/commands, an average utilization value associated with said source server and associated physical resources, wherein said average utilization value comprises a capacity utilization for said source server trended for CPU utilization, memory utilization, network utilization, and I/0 utilization, and wherein said average utilization value is associated with peak and off peak hours during weekdays and weekends;
mapping, by said computer processor, said source server to an application;
comparing, by said computer processor, a source infrastructure with a target infrastructure, wherein said source infrastructure is associated with said source server, and wherein said target infrastructure is associated with said target server, wherein said comparing comprises performing a pattern matching process between data received from said source infrastructure and said target infrastructure, and wherein said target server comprises a virtual server associated with virtualizing said source server;
determining, by said computer processor based on mismatches of said pattern matching process and results of said identifying said dependencies, said calculating, and said comparing, deficiencies and differences associated with said target infrastructure;
generating, by said computer processor, a list comprising dependency requirements for fulfillment in said target infrastructure;

second comparing, by said computer processor, said average utilization value with a resource capability of said target server;

generating, by said computer processor, a list comprising resource requirements for fulfillment on said target server;

determining, by said computer processor, if said target server is appropriate for consolidation with said source server;

generating, by said computer processor, an alert indicating if said source server comprises a correct candidate for said virtualizing said source server;

generating, by said computer processor, an alert identifying differences and requirements for virtualization of said source server;

generating, by said computer processor, an alert indicating if said source dependencies are appropriate for fulfillment in said target infrastructure;

generating, by said computer processor based on results of evaluating multiple environments and utilization patterns, an alert indicating if all applicable requirements are appropriate for fulfillment;

presenting, by said computer processor via a graphical user interface, a feasibility report indicating a feasibility of said resource requirements for fulfillment on said target server.

11. The computer program product of claim 10, wherein said dependencies of said source server are determined on an infrastructure and application level.

12. The computer program product of claim 10, wherein said dependencies of said source server comprise components selected from the group consisting of a database, middleware running on the source server, and a business criticality.

13. The computer program product of claim 10, wherein said method further comprises:

presenting, by said computer processor via said graphical user interface, said resource requirements for fulfillment on said target server.

* * * * *